Patented Feb. 26, 1946

2,395,474

UNITED STATES PATENT OFFICE 2,395,474

VULCANIZATION OF RUBBERY COPOLYMERS OF BUTADIENE-1,3 HYDROCARBONS AND ALPHA-METHYLENE NITRILES

Benjamin S. Garvey, Akron, Ohio, assignor to The B. F. Goodrich Company, New York, N. Y., a corporation of New York No Drawing. Application September 5, 1942, Serial No. 457,474

4 Claims. (Cl. 260—84.5)

This invention relates to the vulcanization of synthetic rubber of the type which may be defined as rubbery copolymers of butadiene-1,3 hydrocarbons and alpha-methylene nitriles, and has as its principal object to provide a method of vulcanizing such copolymers without the use of sulfur and other conventional sulfur-containing vulcanizing agents.

The vulcanization, that is, the conversion from an essentially plastic condition to an essentially elastic non-plastic condition, of rubbery copolymers of butadiene-1,3 hydrocarbons and alpha-methylene nitriles has heretofore been effected by heating the copolymer with about 1 to 10% of sulfur in much the same manner that natural crude rubber is vulcanized. Furthermore it has heretofore been believed that the presence of sulfur or some other conventional sulfur-containing vulcanizing agent such as sulfur monochloride, sulfur dithiocyanate and tetraalkyl thiuram disulfides was absolutely necessary for the vulcanization of this type of synthetic rubber.

I have now discovered, quite surprisingly, that rubbery copolymers of butadiene-1,3 hydrocarbons and alpha-methylene nitriles may be vulcanized in the absence of sulfur and other conventional vulcanizing agents by heating the copolymer either alone or in admixture with the usual compounding ingredients such as softeners, pigments, fillers and the like to a temperature somewhat higher than that employed now-a-days for vulcanization, being of the order of about 290 to 350° F.; and that the vulcanizates thus obtained are quite superior for a number of purposes to the ordinary sulfur-vulcanizates.

Although vulcanization of these copolymers occurs even in the absence of any added ingredients it is usually desirable to compound the copolymer with various materials, excepting sulfur and sulfur-containing vulcanizing agents, which are customarily used in the compounding of natural and synthetic rubber, and then to vulcanize the resulting composition. In this connection it has been found that the addition to the composition of relatively small amounts, say from 1 to 25% on the copolymer of metallic oxides such as the oxides of zinc, cadmium, mercury, lead, calcium, barium, strontium, titanium, vanadium, manganese, iron, cobalt, nickel and the like or mixtures of these, as well as other metallic compounds such as the carbonates and chromates of these metals, is desirable since these materials act as accelerators for the vulcanization without sulfur, and, in addition, improve the oil resistance of the vulcanizate. The use of oxides of bivalent metals such as zinc, cadmium, mercury, lead and the alkaline earth metals or mixtures of these is especially preferred. Certain organic componds such as quinones, hydroquinones, quinone di-imides, quinone mono- and di-imines and quinone mono- and di-oximes also may be used as accelerators for this no-sulfur vulcanization. The conventional accelerators of vulcanization, as distinguished from vulcanizing agents, such as the thiazoles, thiazolines, dithiocarbamates, guanidines and thiazyl disulfides may also be used but they are not preferred since their accelerating effect is not nearly so pronounced as when used in connection with sulfur.

Other substances which may be added to the copolymer composition include reinforcing pigments such as the various carbon blacks, whiting and the like; softeners such as dibutyl phthalate, coal tar, cumar resins and the like; antioxidants such as phenyl beta-naphthyl-amine; and various other conventional rubber and synthetic rubber compounding ingredients. The nature and amounts of such compounding ingredients will obviously depend primarily upon the properties desired in the vulcanizates.

The vulcanization of the rubbery copolymer or copolymer compositions may be carried out in any desired manner as by heating in a mold, in open steam, in hot air, etc., provided that the temperature of the vulcanization is within the range of 290 to 350° F. The time required for the vulcanization will obviously depend upon the temperature and upon the properties desired in the vulcanizate but, in general, it may be said that the time required will vary from as little as 10 minutes, when the temperature is relatively high, say from 330 to 350° F., to as long as 60–120 minutes when the temperature is only about 290–310° F. Best results are usually obtained when the vulcanization is carried out by heating the copolymer or copolymer composition in the substantial absence of air, as in a mold, to a temperature of 310–330° F. for a period of time from 15 to 60 minutes.

The copolymers, or synthetic rubbers, with which this invention is concerned are formed by the copolymerization of a butadiene-1,3 hydrocarbon, by which is meant butadiene-1,3 itself (commonly termed butadiene) and its homologs such as isoprene, 2,3-dimethyl butadiene-1,3, piperylene and the like, with an alpha-methylene nitrile such as acrylonitrile, methacrylonitrile, ethacrylonitrile, butacrylonitrile, alpha-chloroacrylonitrile, alpha-methoxymethyl acrylonitrile, alphachloroethyl acrylonitrile, alpha-phenyl acrylonitrile, alpha-cyclohexyl acrylonitrile or, in general, any nitrile having a methylene group, $CH_2=$, attached to a carbon atom alpha to a nitrile group as in the structure,

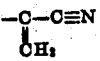

regardless of the nature of the radical to which this structure is connected. The most valuable copolymers of this type for use in the present invention are the copolymers prepared by the copolymerization in aqueous emulsion of butadiene and an aliphatic alpha-methylene nitrile containing less than six carbon atoms such as acrylonitrile. When the butadiene is copolymerized in an amount at least as large as that of the nitrile, rubbery copolymers with which this invention is primarily concerned, are formed but other copolymers prepared using predominant amounts of the nitrile may also be vulcanized by the method of this invention to yield products more nearly resembling leather than rubber. It should also be mentioned that copolymers prepared by copolymerizing butadiene-1,3 hydrocarbons and alpha-methylene nitriles with small amounts of other ethylenic monomers such as styrene, methyl acrylate, methyl methacrylate, vinylidene chloride, and the like, may also be used.

The methods of practicing the invention and the results obtained thereby may be illustrated by the following specific examples, but it is not intended that the invention be limited thereto.

*Example I*

A plastic rubbery copolymer of butadiene and acrylonitrile was prepared by copolymerizing 55 parts by weight of butadiene and 45 parts by weight of acrylonitrile in an aqueous emulsion containing an emulsifying agent, a polymerization catalyst and a polymerization modifier (a compound which increases the plasticity and solubility of butadiene copolymers prepared in its presence), and then coagulating the synthetic latex so obtained. The copolymer was then masticated for about 5 minutes in the presence of a stream of cold water and allowed to dry. A portion of this plastic copolymer was then placed in a mold, heated to a temperature of 310° F. and allowed to remain in the heated mold for 30 minutes. Upon removing the copolymer from the mold it was found to be essentially non-plastic but elastic in properties, that is, it was found to be vulcanized. The vulcanized copolymer possessed a tensile strength of 1250 lbs./sq. in., a 940% elongation, a Durometer hardness of 50 and a Schopper rebound elasticity of 32. This vulcanizate may be used in a number of applications as in the production of thread, bands, tank linings and other applications where "pure gum" compounds, i. e., rubbery compositions containing no fillers, reinforcing pigments or softeners or only small amounts thereof, are ordinarily used. Furthermore this vulcanizate is actually superior to "pure gum" sulfur vulcanizates of this copolymer in that it possesses a higher tensile strength and elongation and is free of localized reddish-brown spots commonly observed with pure-gum sulfur vulcanizates. It is also better suited for use in contact with metals since "pure gum" sulfur vulcanizates often corrode the surface of the metal by the formation of metallic sulfides.

*Example II*

Another "pure gum" vulcanizate was prepared by mixing 100 parts of the butadiene-acrylonitrile copolymer described in Example I with 25 parts of litharge (PbO) and heating the resulting composition in a press for 20 minutes at 310° F. A strong snappy vulcanizate possessing a tensile strength of 2000 lbs./sq. in. and a 740% elongation was obtained. This vulcanizate was also especially valuable because of its excellent heat and oil resistance. When 5 parts of zinc carbonate are substituted for the litharge in this example another heat-resistant vulcanizate possessing a tensile strength of 2300 lbs./sq. in. and a 1000% elongation is obtained. Similar excellent "pure gum" vulcanizates possessing tensile strengths from 2000–2800 lbs./sq. in. are also obtained when 5 parts of cadmium oxide, or 10 parts of lead chromate or 2 parts of lead dioxide are substituted for the litharge in this example.

*Example III*

A composition suitable for use in the manufacture of molded articles required to have high strength and resistance to hydrocarbon fuels was prepared by vulcanizing at 292° F. for 120 minutes a composition containing the following:

| | Parts |
|---|---|
| Butadiene-acrylonitrile copolymer (prepared by copolymerizing in aqueous emulsion 55 parts of butadiene and 45 parts of acrylonitrile) | 100 |
| Zinc oxide | 10 |
| Gastex | 30 |
| Litharge | 20 |

The vulcanizate possessed a tensile strength of 2880 lbs./sq. in., an elongation of 710% and a Durometer hardness of 65.

*Example IV*

A composition was prepared as follows:

| | Parts |
|---|---|
| Butadiene - acrylonitrile copolymer (55:45 emulsion copolymer) | 100 |
| Zinc oxide | 5 |
| Stearic acid | 1 |
| Channel black | 75 |
| Dibutyl phthalate | 10 |
| Coumarone-indene resin | 10 |
| Litharge | 10 |

This composition was heated in a mold for 30 minutes at 320° F. An excellent heat-resistant vulcanizate which may be used in the manufacture of tires and tubes is obtained. The vulcanizate is quite superior in oil-resistance to the ordinary sulfur-vulcanizates. It also possesses a tensile strength of 2800 lbs./sq. in. and a 950% elongation. Similar results may be obtained by substituting the litharge with lead dioxide, lead chromate, manganese oxide, quinone, and hydroquinone.

*Example V*

The butadiene-acrylonitrile copolymer known as Perbunan, a copolymer prepared from 75 parts of butadiene 25 parts of acrylonitrile was compounded in the following recipe:

| | Parts |
|---|---|
| Perbunan | 100.0 |
| Carbon black | 50.0 |
| Zinc oxide | 5.0 |
| Phenyl beta-naphthylamine | 0.75 |
| Soft coal tar | 5.0 |
| Litharge | 10.0 |

This composition possessed a plasticity as determined on the Goodrich plastometer at 100° C. of 72.9. When a sample of this composition was heated in a mold for 15 minutes at 300° F., the plasticity was reduced to 10.3 and the elasticity was considerably increased thus showing that a vulcanization had taken place. When other samples of this composition were heated in a mold for 30 minutes at 250° F. or for 16 hours at 150° F., the plasticity was reduced to only about 60.0, a decrease in plasticity which is too insignificant to be termed a vulcanization.

The above examples have been confined to the vulcanization without sulfur of compositions containing a copolymer of a butadiene-1,3 hydrocarbon and an alpha-methylene nitrile as the sole vulcanizable material. Although this is the preferred procedure it is also possible to vulcanize mixtures of this copolymer with other rubbery materials such as other synthetic rubbers and even natural rubber by the method of this invention but, in this event, the other vulcanizable material should preferably be present in only small amounts and at least one of the materials mentioned hereinabove as being accelerators for this vulcanization without sulfur should be included in the composition.

Other modifications and variations including the substitution of equivalent materials and the variation of the proportions of materials and of the conditions used are within the spirit and scope of the invention as defined in the appended claims.

I claim:

1. The method of vulcanizing a copolymer of a butadiene-1,3 hydrocarbon and an alpha-methylene nitrile which comprises heating a composition which includes said copolymer and an oxide of lead, but which is free of sulfur and other sulfur-containing vulcanizing agents, at a temperature of about 290 to 350° F. for a time sufficient to convert said copolymer to an elastic, non-plastic state, the minimum time of heating being dependent upon the temperature, decreasing with increased temperature, and varying from about 10 minutes at 350° F. to about 60 minutes at 290° F.

2. The method of vulcanizing a rubbery copolymer of butadiene-1,3 and acrylonitrile which comprises heating a composition which includes said copolymer and litharge, but which is free of sulfur and other sulfur-containing vulcanizing agents, at a temperature of about 290 to 350° F. for a time sufficient to convert said copolymer to an elastic, non-plastic state, the minimum time of heating being dependent upon the temperature, decreasing with increased temperature, and varying from about 10 minutes at 350° F. to about 60 minutes at 290° F.

3. A vulcanizate prepared by the method of claim 1.

4. A vulcanizate prepared by the method of claim 2.

BENJAMIN S. GARVEY.